United States Patent
Verma

(10) Patent No.: US 12,213,001 B2
(45) Date of Patent: Jan. 28, 2025

(54) DETERMINING AND IMPLEMENTING ADAPTIVE RETRIES IN CORE NETWORK NODES

(71) Applicant: Microsoft Technology Licensing, LLC, Redmond, WA (US)

(72) Inventor: Devesh Verma, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 17/699,482

(22) Filed: Mar. 21, 2022

(65) Prior Publication Data

US 2023/0300672 A1  Sep. 21, 2023

(51) Int. Cl.
*H04W 28/04* (2009.01)
*H04L 1/18* (2023.01)

(52) U.S. Cl.
CPC .............. *H04W 28/04* (2013.01); *H04L 1/18* (2013.01)

(58) Field of Classification Search
None
See application file for complete search history.

(56) References Cited

U.S. PATENT DOCUMENTS

| | | | |
|---|---|---|---|
| 5,719,882 A | 2/1998 | Ellis | |
| 7,417,956 B2 | 8/2008 | Nakazawa | |
| 7,444,443 B2 | 10/2008 | Sharma et al. | |
| 7,978,599 B2 | 7/2011 | Stone et al. | |
| 8,583,053 B1 * | 11/2013 | Mahbod | H04L 1/1825 455/435.2 |
| 8,929,899 B2 | 1/2015 | Shaw et al. | |
| 9,246,636 B2 | 1/2016 | Wang et al. | |

(Continued)

FOREIGN PATENT DOCUMENTS

| | | | |
|---|---|---|---|
| CN | 1829139 A * | 9/2006 | H04L 1/188 |
| EP | 1540889 B1 | 11/2006 | |
| WO | 2021051014 A1 | 3/2021 | |

OTHER PUBLICATIONS

Brooker, Marc, "Timeouts, Retries, and Backoff with Jitter", Retrieved from: https://web.archive.org/web/20211218235051/https:/aws.amazon.com/builders-library/timeouts-retries-and-backoff-with-jitter/, Dec. 18, 2021, 7 Pages.

(Continued)

*Primary Examiner* — The Hy Nguyen
(74) *Attorney, Agent, or Firm* — Ray Quinney & Nebeker; James Bullough

(57) ABSTRACT

The present disclosure relates to systems, methods, and computer-readable media for managing transmission of retries between computing nodes in a core network environment. For example, systems described herein involve collecting transmission data including timing and failure data for use in generating a retry policy that includes rules and instructions that govern transmission of retries between computing nodes. Once generated, the retry policy may be applied to message packages by selectively transmitting message retries based on specific timing delays that are determined from the collected transmission information. This the generation and implementation of the retry policy may significantly reduce a quantity of retry messages transmitted by computing nodes within a core network architecture, thereby improving network conditions in a variety of ways.

20 Claims, 6 Drawing Sheets

(56) References Cited

U.S. PATENT DOCUMENTS

2020/0195522 A1* 6/2020 Lau .................... H04L 41/5025
2020/0301607 A1* 9/2020 Nerius ............... G06F 11/1402
2020/0374794 A1   11/2020 Juneja

OTHER PUBLICATIONS

"International Search Report and Written Opinion Issued in PCT Application No. PCT/US22/052609", Mailed Date: Apr. 18, 2023, 14 Pages.

* cited by examiner

DETERMINING AND IMPLEMENTING ADAPTIVE RETRIES IN CORE NETWORK NODES

BACKGROUND

Cellular networks can provide computing devices (e.g., mobile devices) with access to services available from one or more data networks. A cellular network is typically distributed over geographical areas that include one or more base stations and core network devices that provide a cell with network coverage. The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN) and a core network. The RAN may include base stations that communicate wirelessly with user devices (e.g., mobile devices) and facilitate interaction with components of a core network. The core network may provide access to services and data available from one or more external networks. As noted above, cellular networks are often used to provide Internet connectivity to mobile devices.

As will be discussed in further detail herein, a core network may provide a variety of functions, including providing Internet protocol (IP) connectivity for both data and voice services, ensuring this connectivity fulfills the promised QoS requirements, ensuring that user devices are properly authenticated, tracking user mobility to ensure uninterrupted service, and tracking subscriber usage for billing and charging.

As cellular networks have become more complex and more widespread, a number of difficulties have arisen in transmitting and processing messages between network devices. For instance, as network conditions can vary at different geographic locations and between different devices, messages or packets that are transmitted between network devices are often dropped or fail to be successfully delivered and processed from one device to another. As messages are often transmitted over multiple hops from a source device to a destination device, tracking successful delivery as well as ensuring that messages are delivered effectively can pose a number of challenges.

In conventional networking systems, a network device will perform a retry mechanism where a message is not delivered or otherwise processed successfully from one device to another. In this scenario, conventional devices will often simply transmit a retry message as many times as necessary until the message is successfully delivered to a target device. This can cause significant problems, however, where network conditions are poor or under various conditions where a significant number of retry messages are transmitted. Indeed, this can cause an avalanche of retries that cascade over multiple network devices, which can overload a network. Moreover, this will often result in a network having difficulty recovering from poor network conditions and prevent any number of client devices from gaining access to an external data network.

These and other problems exist in connection with transmitting and receiving retry messages in a cellular network.

DETAILED DESCRIPTION

Figure 1:
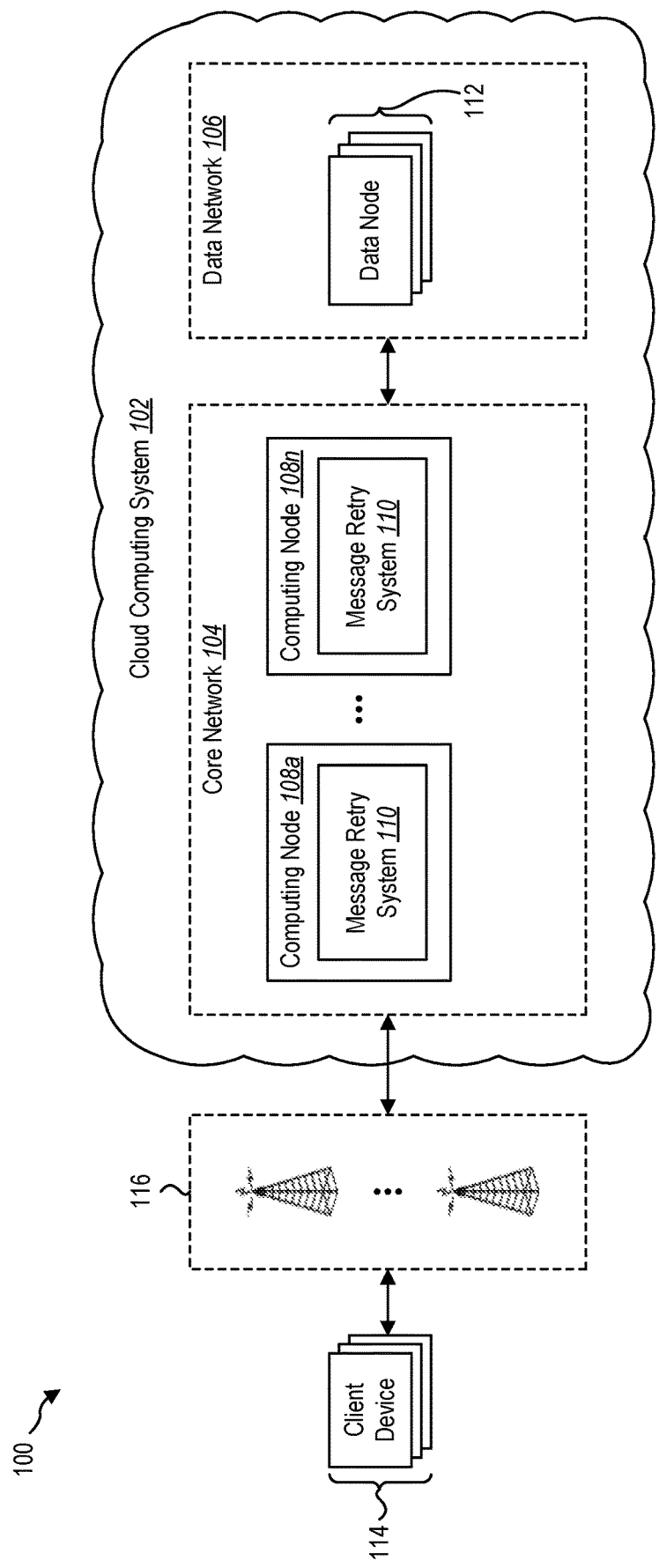
FIG. 1 illustrates an example environment including a cellular network having a plurality of computing nodes thereon in accordance with one or more embodiments.

The present disclosure relates generally to systems, methods, and computer-readable media for managing transmission of retries between network devices (e.g., computer nodes) in a cellular network environment (e.g., a core network telecom environment). In particular, the present disclosure involves collecting transmission information in connection with a plurality of transmitted messages (e.g., messages transmitted during an observation period) and determining a timing delay that facilitates reducing the number of retries transmitted between computing nodes in a network environment without causing a significant increase in the number of messages that are unsuccessfully transmitted. As will be discussed in further detail below, a message retry system may generate and/or implement a retry policy based on the transmission information to determine an optimal timing relative to sending a first message when a retry message should be sent in the cellular network environment.

As an illustrative example, and as will be discussed in further detail below, a computing node in a core network telecom environment may collect transmission information for a plurality of messages between the computing node and a plurality of computing nodes on a cellular network. The transmission information may include timing data indicating durations of time between sending of the messages and receiving responses to the messages. The transmission information may also include failure data indicating a number or portion of the messages that failed to be successfully communicated between the computing nodes. Based on the transmission information, the computing node may generate or receive a retry policy that includes an indication of most likely request processing duration during a timeout interval. As will be discussed in further detail below, the computing node may apply the retry policy to a message transmitted by the computing node by selectively transmitting a retry message after a specific duration of time has passed based on the most likely request processing duration from the retry policy.

As will be discussed in further detail below, the present disclosure includes a number of practical applications having features described herein that provide benefits and/or solve problems associated with transmitting messages and associated retry messages in a cellular network environment. Some example benefits are discussed herein in connection with various features and functionalities provided by a message retry system implemented on one or more computing nodes. It will be appreciated that benefits explicitly discussed in connection with one or more embodiments described herein are provided by way of example and are not intended to be an exhaustive list of all possible benefits of the message retry system(s).

For example, by generating a retry policy that facilitates selective transmission of a retry message within a timeout interval, the message retry system can significantly reduce the number of retries transmitted by computing nodes in a cellular network. By reducing the number of retries, the message retry system can reduce processing expense on the respective nodes as well as reduce the quantity of bandwidth demanded by computing nodes that are transmitting and relaying, receiving, or otherwise responding to the received retry messages. This reduction of message retries can significantly reduce or lessen the effect of avalanches of retry messages that monopolize network resources and cause cellular networks to underperform or go down unexpectedly.

In addition to generally reducing the number of retry messages, by determining a most likely request processing duration based on the collected transmission information (e.g., historical transmission information), the message retry system can spread out and further reduce the number of retry messages based on actual (normal) conditions of the cellular network. For example, by determining a latest retry time based on the transmission information, the message retry system can selectively transmit a retry message at a time that allows for the vast majority of successfully transmitted messages to be delivered while also within a duration of time that does not pose a significant risk that a transmitted message will timeout under normal operating conditions.

Indeed, as will be discussed in further detail below, the message retry system may select a specific timing of when to send the retry message in a way that both reduces the number of retry messages transmitted by computing nodes of the network environment while ensuring that an optimal number of the message retries are successful. As will be discussed in further detail below, by determining the specific timing and only transmitting a single retry message for a given message, the message retry system can avoid re-transmitting unnecessary request messages that have a low likelihood of successful response before the timeout period. This provides a significant improvement over conventional systems, which often transmit a significant number of retry messages within the timeout period in an attempt to simply maximize the number of messages that are transmitted in hope that one will be successfully processed. This inefficient process can be avoided by selectively transmitting the retry message in accordance with one or more embodiments described herein.

As a non-limiting example, in one or more embodiments, the message retry system tracks a total number of recent retries. This tally of retries can be compared to a threshold of acceptable retries within a predetermined period to determine if the retries are a product of a particular device going down or if network conditions are poor between multiple devices. When this determination is made, the message retry system may cause the computing node(s) to significantly reduce or even stop transmission of message retries for a period of time. This adjustment in network behavior enables the cellular network to recover faster as a result of unnecessary retry messages consuming valuable bandwidth. This determination may also be used to apply a more selective retry policy where select critical messages are provided the benefit of retry messages while other messages that are not as critical or that arrive from particular sources are not retried. This can further free up bandwidth on the network and improve general network conditions or allow a network to recover from poor network conditions.

In addition to the benefits discussed above, features and functionalities described herein can apply to a number of network environments and across a wide variety of computing nodes. For example, as will be discussed below, the message retry system may be applied on computing nodes that are implemented within a variety of network architectures and which communicate using a variety of communication protocols. For instance, features and functionalities described in connection with one or more embodiments herein can apply to third generation (3G), fourth generation (4G), and/or fifth generation (5G) architectures and frameworks. In addition, features and functionalities described herein may be implemented on a wide variety of computing nodes on a cellular network. For instance, the message retry system may be implemented on a gateway device, such as a packet data network (PDN) gateway, a serving gateway, a mobile management entity (MME), or any other computing node on a cellular network. In one or more embodiments, the message retry system may be implemented on any computing node on a core network (e.g., a telecom core network).

As illustrated in the foregoing discussion and as will be discussed in further detail herein, the present disclosure utilizes a variety of terms to describe features and advantages of methods and systems described herein. Some of these terms will be discussed in further detail below.

As used herein, a "computing node" may refer to any device (e.g., a network device) implemented on a cellular network (or core network portion of a cellular network) that has a defined functionality that the device can offer to the overall network architecture. Each computing node may have a respective set of defined functions in the network architecture. Each of the computing nodes may be configured to receive and/or transmit a message to another computing node within the network architecture. In one or more embodiments, a computing node specifically refers to a gateway node (e.g., a PDN gateway or serving gateway node) having responsibility for authentication of a subscriber, charging of a subscriber, interception of a subscriber, or other defined functions. Nevertheless, while one or more examples are discussed in connection with a gateway node, the computing node may refer to any computing node within the network architecture (e.g., any node within a core network).

As used herein, a "message" or "message request" may refer to a data object that contains data that may be transmitted between computing nodes. In one or more embodiments described herein, a message refers to a communication packet which contains information that is encoded in a specific protocol. In one or more embodiments described herein, a message refers to a UDP packet including information encoded in a GTP protocol. Alternatively, a message may be encoded in an HTTP protocol, and may include information specific to a particular substrate. As will be discussed herein, a message may be transmitted by a computing node to be received and/or processed by another computing node (e.g., a destination or receiving computing node).

As used herein, a "retry message" may refer to a message that is a copy of another message that was previously transmitted to another computing node. In one or more embodiments described herein, a retry message is generated and transmitted based on a detected or otherwise determined (e.g., predicted or confirmed) failure of a previously transmitted message. For instance, a retry message may be transmitted based on a period of time passing within which a reply to a message (or retry message) has not been received. In one or more embodiments, a retry message may be transmitted based on receiving a failure reply indicating that the message (or retry message) was not successfully processed.

As used herein, a "message reply" or "reply" may refer to a message that is provided in response to receiving and/or processing a transmitted message. In one or more embodiments described herein each message may be configured to solicit a response. For example, a response may indicate a positive or negative receipt of the message and may contain information therein based on any information solicited from the original message. The content of the reply may differ based on how a computing node is responding (e.g., positive response, negative response).

As used herein, a "retry policy" refers to rules, settings, parameters, or any instructions associated with transmitting a retry message. For example, as will be discussed in further detail herein, a retry policy may indicate a latest retry time indicating a duration of time after sending an initial message that a retry message should be sent. In one or more embodiments, the retry policy may include a rule for sending a single message within a timeout interval for a given message. In one or more embodiments, the retry policy may include a total number of retries that may be transmitted for a computing node or by a plurality of computing nodes within a network architecture. Indeed, the retry policy may include any information or instructions governing transmission of message retries by one or more computing nodes within a cellular network.

As used herein, a "timeout interval" may refer to a predetermined period of time after which a message is dropped if the message has not received a positive response (e.g., a response indicating successful receipt and processing of a message). A timeout interval may refer to a specific duration of time (e.g., 5-10 seconds). In one or more embodiments described herein, a timeout interval initiates from when a first message is transmitted.

As used herein, "transmission information" may refer to any data collected by a computing node in connection with messages and/or retry messages that have been transmitted by one or more computing nodes. In one or more embodiments described herein, transmission information refers to timing data associated with durations of time between sending messages and receiving message replies. The transmission information may further include failure data indicating the number of messages that were unsuccessfully delivered or which failed to be processed correctly. The transmission information may include a number or timing data for retry messages. In one or more embodiments described herein, transmission information refers to data collected over a predetermined period of time (e.g., over an hour of time). Transmission information may refer specifically to information collected over a period of time associated with normal network conditions (e.g., typical network conditions or conditions falling within a normal range of detected network failures).

As used herein, a "cloud computing system" or "cloud computing network" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. Moreover, in one or more embodiments a data network may be implemented on the same or on a different cloud computing network as the portion of the cellular network.

Additional details will now be provided regarding systems described herein in relation to illustrative figures portraying example implementations. For example, FIG. 1 illustrates an example environment 100 for implementing features and functionality of a message retry system on one or more computing nodes in accordance with examples described herein. For example, FIG. 1 illustrates an example environment 100, which may include components of a cellular network that enables client devices to communicate with and obtain access to data on a data network (e.g., an external data network).

As shown in FIG. 1, the environment 100 may include a cloud computing system 102 having components of a core network 104 and a data network 106 thereon. As shown in FIG. 1, the core network 104 may include a plurality of computing nodes 108a-n, which may refer to a variety of network nodes having well defined purposes within the architecture of the core network 104. Some or all of the computing nodes 108a-n may have a message retry system 110 implemented thereon. As further shown, the data network 106 may include any number of data nodes 112 having data thereon that may be accessible to a plurality of client devices 114. As further shown, the environment 100 may include a network of base stations or mobile stations 116 capable of relaying messages and other communications between the client devices 114 and components of the core network 104.

As noted above, the computing nodes 108a-n may refer to a variety of computing nodes within a core network architecture. For example, one or more of the computing nodes 108a-n may refer to gateway nodes, MME node(s) or any other computing node having a defined function within the framework of the core network 104. In one or more examples described herein, a computing node may refer to a PDN gateway that functions as a gateway to the Internet or data nodes 112 of the data network 106. In one or more embodiments, the computing node may refer to a serving gateway that acts an anchor point for messages moving from one tower to another tower or from one node to another node within the core network 104. In one or more embodiments, the computing node may refer to an MME node, which interfaces directly with the mobile stations 116.

In addition, while the core network 104 and data network(s) 106 are illustrated within a single cloud computing system 102, one or more embodiments of the respective networks 104, 106 may be implemented across multiple cloud computing systems. For example, in one or more embodiments, components of the core network 104 are implemented on a first cloud computing system while some or all of the data nodes 112 are implemented on an external network and/or on a second cloud computing system.

The client devices 114 may refer to a variety of computing devices including, by way of example, a mobile device such as a mobile telephone, a smartphone, a personal digital assistant (PDA), a tablet, or a laptop. Alternatively, one or more of the client devices 114 may refer to non-mobile devices such as a desktop computer, a server device (e.g., an edge network server), or other non-portable devices. In one or more embodiments, a client device may refer to an application or software construct on a computing device. Each of the devices of the environment 100 may include features and functionality described generally below in connection with FIG. 6.

As shown in FIG. 1, one or more components of the environment 100 may be implemented within an architecture of a cellular network. For example, as noted above, a cellular network may include a radio access portion inclusive of a network of mobile towers 116 in combination with components of a core network 104. Thus, as used herein, a cellular network may refer broadly to an architecture inclusive of the mobile towers 116 and computing nodes 108a-n of the core network 104 while some implementations of the core network architecture may exclude the mobile stations 116.

As shown in FIG. 1, some or all of the computing nodes 108a-n may include a message retry system 110 implemented thereon. As will be discussed in further detail below, the message retry system 110 may collect transmission information for the computing node(s) 108a-n based on messages that are transmitted from the respective computing nodes 108a-n. The message retry system 110 may consider the transmission information in generating a retry policy.

One or more embodiments described herein may refer specifically to a retry policy generated based on transmission information collected by and analyzed on and for a respective computing node. Nevertheless, it will be appreciated that transmission information collected by any of the computing nodes 108a-n may be considered in creating a retry policy on a specific computing node. In one or more embodiments, a particular computing node (e.g., a gateway node) having a high level of access to other computing nodes within the core network 104 may generate a retry policy and distribute the retry policy based on the collected transmission data to any number of the computing nodes 108a-n on the core network 104. Additional detail in connection with the message retry system 110 will be discussed below in connection with FIG. 2.

Figure 2:
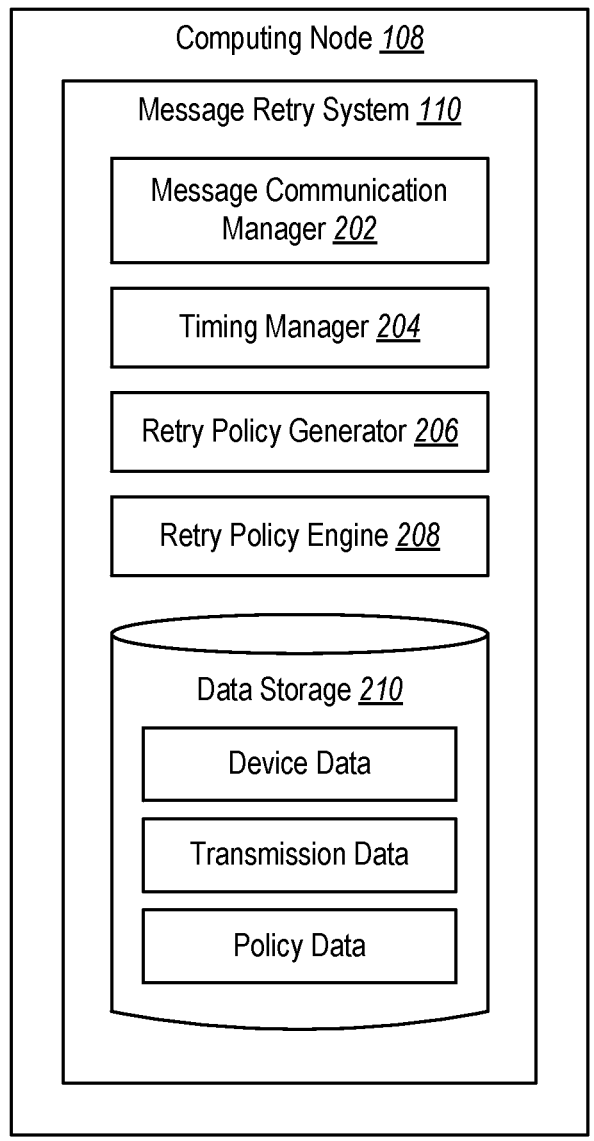
FIG. 2 illustrates an example computing node having a message retry system implemented thereon in accordance with one or more embodiments.

FIG. 2 illustrates an example computing node 108 having the message retry system 110 implemented thereon. The computing node 108 may refer to any of the computing nodes 108a-n having the message retry system 110 thereon discussed above in connection with FIG. 1. For example, the computing node 108 may refer to a gateway node (e.g., PDN gateway node, serving gateway node), an MME node, or any other computing node within the framework of the core network 104. Indeed, the computing node 108 may refer to any node having a defined function and including the message retry system 110 thereon.

In one or more embodiments, the message retry system 110 includes a message communication manager 202. The message communication manager 202 may control communication (e.g., transmission and/or receipt) of messages to and from the computing node 108. For example, the message communication manager 202 may facilitate transmission of a message from the computing node 108 to any other computing node within a core network 104. The message communication manager 202 may further be configured to process or otherwise generate a response to an incoming message from any other computing node.

In one or more embodiments, the message communication manager 202 generates the messages prior to transmission. As noted above, each message may include information soliciting a response from a destination computing node. Upon receiving a response, the message may be classified as or otherwise considered a successfully delivered message (or simply a "successful message") where a response is processed and responded to within a timeout interval. Alternatively, where a response to a message is not processed within a duration of the timeout interval, the message may be classified as or otherwise considered a failed message. In one or more embodiments, the message communication manager 202 may determine whether a message is a successful message or an unsuccessful message.

In one or more embodiments, the message communication manager 202 can collect and store transmission data indicating successful and/or failed messages for any number of messages transmitted by the computing node 108. For example, the message communication manager 202 may maintain a record of a percentage of messages that are successfully or unsuccessfully delivered to a destination computing node. As noted above, the message communication manager 202 may determine successful or unsuccessful delivery of any of the messages based on whether the computing node 108 receives a response indicating successful delivery and processing of the message within a predetermined timeout interval.

As further shown in FIG. 2, the message retry system 110 may include a timing manager 204. The timing manager 204 may provide a number of features and functionality related to tracking or determining timing data related to any message transmitted and/or received by the computing node 108. For example, in one or more embodiments described herein, the timing manager 204 may collect timing data associated with messages that are transmitted and responded to during a defined period of time. As will be discussed in further detail below (e.g., in connection with FIG. 3), the timing manager 204 may optionally plot the timing data on a graph and/or store the timing data within a table or record on the computing node 108.

In one or more embodiments, the timing manager 204 may collect and compile historical timing data for the computing node 108. In one or more embodiments, the timing manager 204 tracks delays between sending messages that are sent during normal network conditions to determine typical delays that can be expected under normal network conditions. As used herein, "normal network conditions" may refer to network conditions having network conditions that fall within normal threshold network characteristics. For example, normal network conditions may be determined based on observed communication speeds, bandwidth, download speeds, or any other measurable network characteristic falling within a threshold characteristic or metric. In one or more embodiments, normal network conditions may be determined based on observed transmission information, such as an observed success or failure rate of messages that are transmitted and processed successfully between nodes of a core network. For instance, where transmission information includes failure data associated with a percentage (or other quantity) of messages that fail to be successfully communicated between computing nodes, normal network conditions may be based on the failure data (or other transmission data such as timing data) indicating that a threshold percentage of messages are successfully communicated between computing nodes over a predetermine period of time (e.g., one hour, one day).

As noted above, the timing manager 204 may transmit messages under normal network conditions. In one or more embodiments, the timing manager 204 may track the delays and determine trends and typical delays (e.g., average delays) over a predetermined period of time (e.g., 1-2 hours, 1-2 days). The timing manager 204 may analyze the delays and determine timing information indicating how long it takes for a typical message to receive a reply. In one or more embodiments, the timing manager 204 may determine certain thresholds of delays, such as how long it takes for 95% or 99% of messages to be responded to successfully. As will be discussed below, the timing manager 204 may determine certain delay times (e.g., most likely request processing duration, latest retry time) based on the various thresholds of delays associated with corresponding rates of successful message transmission. Additional information in connection with collecting and analyzing timing data will be discussed below in connection with FIG. 3.

As further shown in FIG. 2, the message retry system 110 may include a retry policy generator 206. The retry policy generator 206 may generate rules, policies, or any instructions associated with sending retry messages subsequent to sending associated original messages from the computing node 108. As an example, the retry policy generator 206 may indicate a rule to send a single retry message (e.g., only a single retry message rather than multiple retries) for a corresponding message. As noted above, reducing the number of retries on a per/message or per/device basis can significantly reduce the expense of network resources caused by repeatedly transmitting redundant and often ineffective retries associated with the same message, as is often done in conventional systems.

In one or more embodiments, the policy generator 206 may consider the timing data to determine a most likely request processing duration. In accordance with one or more embodiments described herein, a most likely request processing duration may indicate a timing within a timeout period when a message is expected to have been processed (e.g., based on a threshold percentage of previously transmitted messages that were processed). In one or more embodiments, the message retry system 110 is configured or otherwise instructed to selectively transmit a retry message at a point within the timing interval at a latest retry time, which will be discussed in further detail below.

In one or more embodiments, the most likely request processing duration is based on timing data indicating a duration of time from a beginning of a timeout period when the message retry system 110 can assume or have an associated metric of confidence that the message would be responded to had the message been successfully received and processed by a destination device. In one or more implementations, the most likely request processing duration may indicate a point in time within a timeout period after a threshold percent of messages are successfully delivered (e.g. under normal network conditions). For instance, in one or more embodiments, the most likely request processing duration may indicate a point in time or a duration of time after which, 90%, 95%, 99%, or other configurable percentage of messages were successfully delivered under normal network conditions (e.g., based on the timing data and failure data collected by other components 202-204 of the message retry system 110).

In one or more embodiments described herein, the retry policy may indicate a latest retry time as a point in time within a timeout interval when a retry message should be delivered. Nonetheless, it will be appreciated that while one or more embodiments describe transmitting the retry message at the latest retry time, other implementations may transmit a retry message at some point prior to the latest retry time and after the most likely request processing duration within a timeout interval. In accordance with one or more embodiments described herein, the most likely request processing duration and the latest retry time are determined based on the collected transmission information (e.g., the timing data).

In addition to creating a policy, rule, or instructions for delaying transmission of the retry message after the most likely request processing duration, the policy generator 206 may additionally indicate more specific timing of when to send the retry message within the timeout period. For example, in addition to indicating that the retry message should be sent after passage of the most likely request processing duration, the policy generator 206 may indicate a latest retry time (e.g., a late interval delay) indicating a last time within the timeout interval that the retry message should be transmitted with a threshold chance of success. Similar to the most likely request processing duration, the latest retry time may be determined based on the duration of time that a threshold percentage of messages were delivered successfully under normal network conditions and a total timeout interval.

For example, in one or more implementations, the latest retry time is determined by the difference of a total timeout interval and the most likely request processing duration while allowing some buffer to ensure that a response arrives within the timeout interval. As an illustrative example, where a timeout interval is eight (8) seconds and a most likely request processing duration is one (1) second, a latest retry time may be determined to be 6.9 seconds (e.g., 1.1 seconds prior to the end of the timeout interval). This selection of 6.9 seconds may be based on the most likely request processing duration being one (1) second and providing a buffer of 0.1 seconds (or other configurable amount) to increase a likelihood that a reply to the retry message is received within the timeout interval.

Accordingly, the policy generator 206 may determine a range of time within a timeout interval that a retry message may be transmitted with a reasonable chance of success. In one or more embodiments, this may be any point between the most likely request processing duration and the latest retry time discussed above. For example, the policy generator 206 may generate a rule that a retry message be delivered at some point between these two delay times. In one or more embodiments, the policy generator 206 may intentionally delay until the latest retry time (or shortly before the latest retry time) to spread out messages and retries as much as possible and grant the highest chance that a message will be replied to prior to sending the retry. Alternatively, the policy generator 206 may determine a rule to send the retry message earlier in the timeout interval to allow the retry message a higher likelihood of success. Thus, in one or more embodiments, the policy generator 206 selects a time at a latest retry time (allowing for a buffer) within the timeout interval to send a retry message in an effort to reduce the number of retry messages sent by a given computing node.

In addition to determining the various delay timings and specific rules of when to send a retry message within a timeout interval, the policy generator 206 may further determine a number of maximum retries that should be attempted within a threshold period of time. For example, the policy generator 206 may consider a count of retries that were observed during normal network conditions and determine a threshold count of retries over a similar period of time when the network conditions should be considered. The resulting retry policy may indicate instructions associated with stopping or selectively transmitting retries based on an observed count of retries over a recent period of time. The maximum number of retries may be based on some percentage of a total number of retries observed during an observation or test period (e.g., when the plurality of messages were transmitted and observed).

The policy generator 206 may further establish rules governing how selective retries should be transmitted when a maximum number of retries are observed for a corresponding period of time. For example, in one or more embodiments, the policy generator 206 may generate a rule in which retries are simply discontinued for a period of time until normal network conditions can be reestablished. In one or more embodiments, the policy generator 206 may implement a more strict or selective policy for transmitting retries.

As another example, the policy generator 206 may discriminate in sending retries based on information contained within a corresponding message or any characteristic associated with the message. For example, the policy generator 206 may determine a rule to prioritize retries for messages associated with high priority subscribers (e.g., high priority accounts associated with messages originating from particular devices or sources) while not sending retries for messages associated with lower priority subscribers or sources. Indeed, these rules are provided by way of example and a variety of different criteria and message/node/subscriber characteristics may be considered in generating a rule for selectively transmitting retries for corresponding messages.

As further shown in FIG. 2, the message retry system 110 may include a retry policy engine 208. The retry policy engine 208 may apply the retry policy to messages. In one or more embodiments, the retry policy engine 208 applies the retry policy to the messages by selectively transmitting a retry message for a corresponding message based on a timing of when the message was transmitted and based on the most likely request processing duration determined from the transmission information (and indicated within the retry policy). Indeed, the retry policy engine 208 may transmit a retry message in accordance with any of the rules indicated within the retry policy.

By applying the retry policy to the message(s), the retry policy engine 208 may provide a benefit of selectively transmitting retry messages at a particular point in time within a timeout interval based on historical transmission data collected for a network and/or computing node 108. For example, the retry policy engine 208 may apply a rule that is generated based on normal networking conditions for the particular computing node 108 rather than a generic or static rule based on a user parameter or network-agnostic consideration. In addition, by selectively transmitting retry messages, the retry policy engine 208 may significantly reduce the number of retries transmitted by the computing node 108 and other computing nodes, thus reducing expense of networking resources on the core network 104.

As further shown in FIG. 2, the message retry system 110 may include a data storage 210 including a variety of information maintained thereon. For example, as shown in FIG. 2, the data storage 210 may include device data, transmission data, and retry policy data.

As just mentioned, the data storage 210 may include device data. The device data may include any information associated with the computing node 108 and any other computing node on the core network 104. The device data may include source data that may be used to identify the computing node 108 as a source of a corresponding message. The device data may include an identification of a defined function of the computing node 108 within the architecture of the core network 104. The device data may include system metadata indicating specifications, hardware, a generation identifier, or any other information associated with the computing node 108. In one or more embodiments, the device data may include information about the network itself, such as various network condition metrics (e.g., information and parameters associated with normal networking operating conditions).

As noted above, the data storage 210 may further include transmission data. The transmission data may refer to any of the transmission information discussed herein that is collected and stored based on sending and receiving messages. For example, the transmission data may include timing data and failure data associated with any number of messages (e.g., test messages) transmitted by the computing node 108. In one or more embodiments, the transmission data may include an indication of a number of retries and associated rate of success of transmitting the retry messages.

As mentioned above, the data storage 210 may include retry policy data. The retry policy data may include any policies, rules, or instructions and associated data included within a retry policy generated by the message retry system 110. For example, the retry policy data may include an indicated timeout interval. The retry policy data may include an indication of one or more delays to consider in selectively sending a retry message. For example, the retry policy data may include an indication of a most likely request processing duration indicating a time by which a threshold percentage (e.g., 90% or other configurable amount) of requests are expected to be processed. The retry policy data may also include an indication of a late retry time indicating a maximum time to wait before sending a retry (e.g., a latest time within the timeout interval that a retry message should be sent). The retry policy data may include an indication of any specific point in time between the indicated delays that a retry message should be said. The retry policy data may include instructions to only send a single retry message for a corresponding message. The retry policy data may include a total number of retries that, when observed over a predetermined period, prompt a new selective retry rule in which retry messages are discontinued for a time or certain criteria is applied in determining which messages should be followed up with a retry message. Indeed, the retry policy data may include any information associated with any of the rules and policies described in accordance with one or more embodiments herein.

Figure 3:
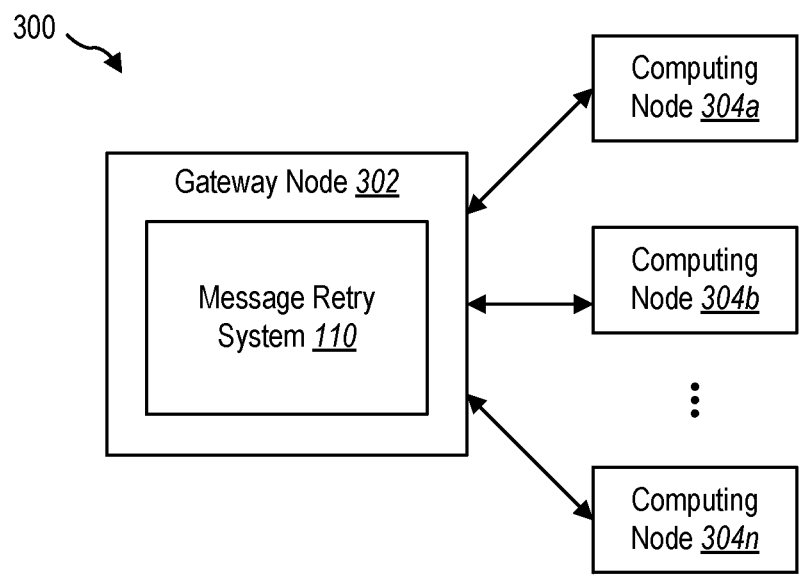
FIG. 3 illustrates an example timeline and associated graph showing historical communication data between a gateway node and additional computing nodes of a cellular network in accordance with one or more embodiments.
Figure 3:
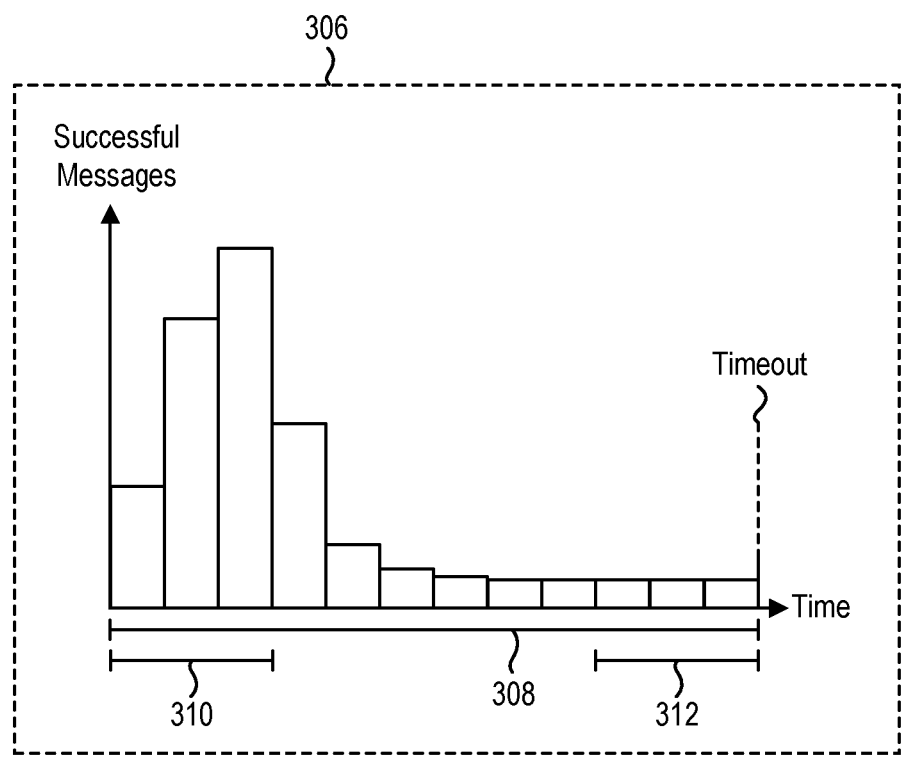

Additional information will now be discussed in connection with an example environment in which a computing node collects transmission information and generates a retry policy in connection with one or more embodiments described herein. In particular, FIG. 3 illustrates an example environment 300 showing a gateway node 302 having a message retry system 110 implemented thereon. In accordance with one or more embodiments described herein, the gateway node 302 may refer to a PDN gateway node, a serving gateway node, or a gateway node that includes a combination of serving gateway and PDN gateway functionalities implemented thereon. It will be understood that while FIG. 3 illustrates an example gateway node 302 having the message retry system 110 thereon, features discussed in connection with the example shown in FIG. 3 may apply to any other computing node on the core network 104 on which a retry policy can be implemented.

As noted above, the message retry system 110 may facilitate transmitting any number of messages between the gateway node 302 and a plurality of additional computing nodes 304*a-n*. The additional computing nodes 304*a-n* may refer to any of the computing nodes 108*a-n* of the core network 104 as discussed above in connection with FIG. 1. As discussed above, each of the messages may include instructions that prompt a response from the computing nodes 304*a-n* upon receiving a message from the gateway node 302. In one or more embodiments, the messages are transmitted under normal networking conditions.

In accordance with one or more embodiments described above, the message retry system 110 may collect transmission data associated with the plurality of messages. For example, the message retry system 110 may collect and maintain failure data associated with a number of messages that fail to be successfully communicated from the gateway node 302 to the computing node 304. The message retry system 110 may determine that a given message is a failed message based on not receiving a response from the computing nodes 304a-n. Alternatively, the message retry system 110 may determine that a given message is a failed message based on receiving a failure response from the computing nodes 304a-n.

The message retry system 110 may additionally collect and maintain timing data associated with timing of when the messages were successfully communicated and processed. For example, the message retry system 110 may collect timing data indicating durations of time between the gateway node 302 sending the messages and receiving successful responses from the additional computing nodes 304a-n.

The message retry system 110 may maintain a record of the transmission information on the gateway node 302. As shown in FIG. 3, the message retry system 110 may generate a transmission record 306 indicating timing data associated with each of the messages that were processed by the gateway node 302. As shown in FIG. 3, the transmission record 306 may include a plot indicating a number of successfully transmitted messages over some period of time that were processed within specific time ranges of a timeout interval 308.

As shown in FIG. 3, the transmission record 306 shows processing times for a plurality of messages. In one or more embodiments, the message retry system 110 bucketizes the observed processing times to show a volume of messages that are successfully processed (e.g., communicated and responded to) within a short time range of the corresponding bucket. In this example, the message retry system 110 may group the processing times into discrete buckets (e.g., 0.5 seconds) over a timeout interval of some predetermined duration of time (e.g., 8 seconds).

As shown in FIG. 3, the message retry system 110 may determine a number of delay values associated with success rates of the messages. For example, in accordance with one or more embodiments described above, the message retry system 110 may determine a most likely request processing duration 310. The most likely request processing duration 310 may refer to an interval of time over which a percentage of messages were successfully processed. As an example, the message retry system 110 may determine the most likely request processing duration 310 based on a determination that 95% (or other percentage) of messages were successfully processed within a duration of time of the most likely request processing duration 310.

In addition to the most likely request processing duration, the message retry system 110 may determine a latest retry time 312 (or, in some examples, a latest retry time). As discussed above, the latest retry time 312 may indicate a latest time on the timeout interval 308 that a retry policy points to as a latest possible time that a retry message should be delivered. This specific point in time may be determined based on a length of the most likely request processing duration 310. For example, in one or more embodiments, the latest retry time 312 duration may be the same (or slightly longer) than the most likely request processing duration 310 to provide adequate time for a destination computing node to respond to a retry message. For instance, where the most likely request processing duration 310 is a one (1) second duration, the latest retry time 312 may similarly be a one (1) second duration.

In one or more embodiments, the latest retry time 312 may be slightly longer than the most likely request processing duration 310. For example, where the most likely request processing duration 310 is one (1) second, the latest retry time 312 duration may be 1.1 seconds in length. This extra time may provide adequate assurance that the retry message will be responded to before the end of the timeout interval 308. In one or more embodiments, the message retry system 110 selects a specific point in time within the timeout interval that would maximize an area under the curve of the plotted transmission information between the original message and the retry message. It will be understood that FIG. 3 illustrates one example depiction and is not necessarily drawn to scale. For example, while not necessarily illustrated in FIG. 3, in one or more embodiments, the most likely request processing duration 310 may be shorter than a timing of the latest retry time 312, as discussed in one or more examples herein.

As noted above, the gateway node 302 may generate a retry policy based on the timing data and failure data observed from the messages transmitted by the gateway node 302 and the computing nodes 304a-n. Upon generating the retry policy, the message retry system 110 may cause the retry policy to be implemented on the gateway node 302 in connection with subsequent messages generated and transmitted by the gateway node 302. In one or more embodiments, the message retry system 110 may distribute the retry policy to one or more of the additional computing nodes 304a-n. The computing nodes 304a-n may then execute or otherwise implement the retry policy locally on the respective device(s).

Figure 4:
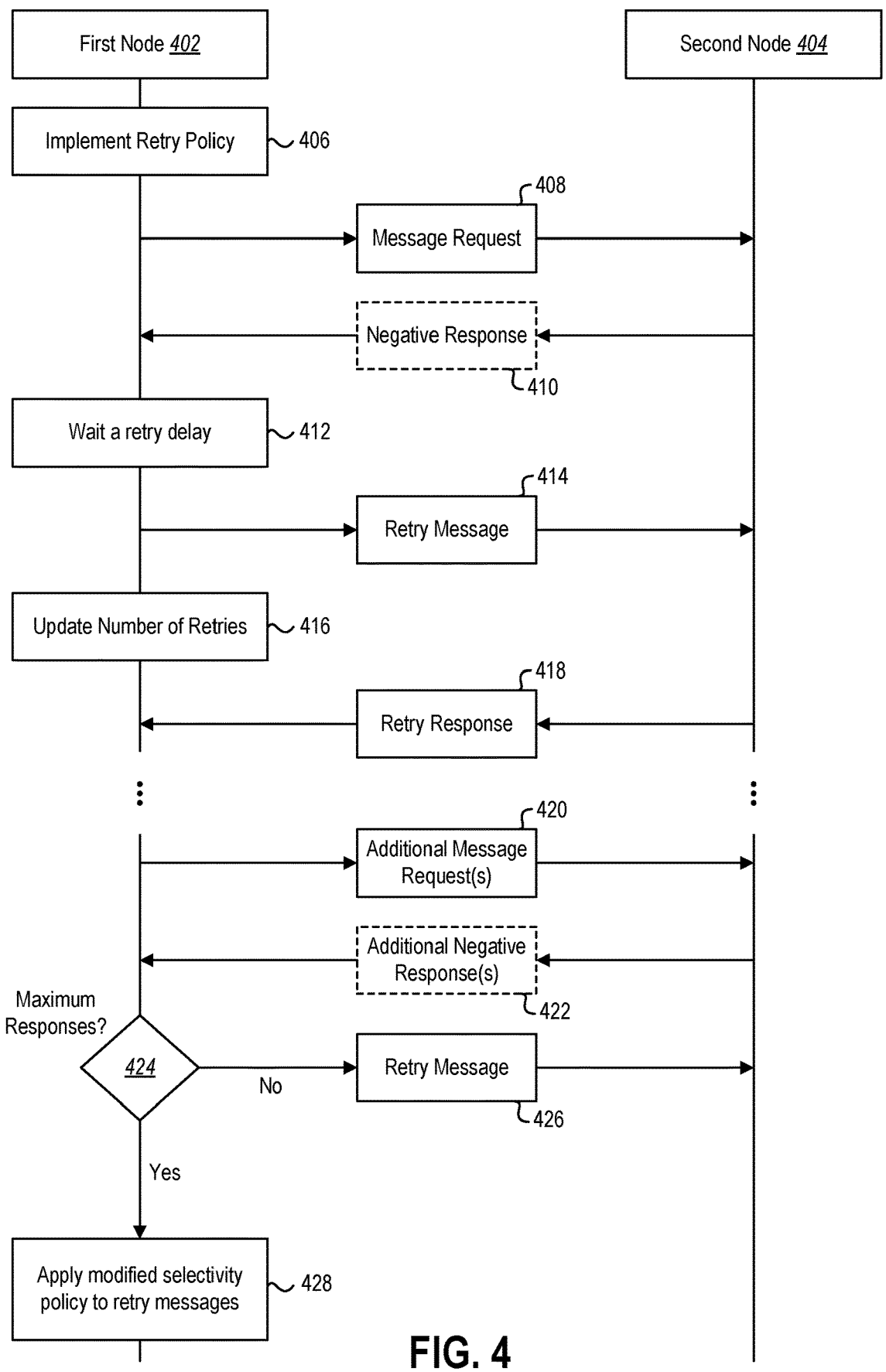
FIG. 4 illustrates an example sequence of interactions between computing nodes showing implementation of the message retry system in accordance with one or more embodiments.

Additional details will now be discussed in connection with transmitting and responding to a message between two computing nodes. For example, FIG. 4 illustrates an example series of interactions between a first computing node 402 (or simply "first node 402") and a second computing node 404 (or simply "second node 404") based on a retry policy implemented on the first and/or second computing nodes 404. The first and second computing nodes 402, 404 may refer to any example computing nodes from a core network as discussed above.

As shown in FIG. 4, the first node 402 may perform an act 406 of implementing a retry policy. As discussed herein, the retry policy may be generated and implemented on the first node 402. Alternatively, in one or more embodiments, the retry policy may be generated on another computing node and provided to the first node 402 for execution thereon. In either event, the retry policy may include instructions for selectively transmitting retry messages based on historical transmission data collected for various computing nodes on a core computing network 104.

As further shown in FIG. 4, the first node 402 may perform an act 408 of providing a message request to the second node 404. For example, the first node 402 may transmit the message request to the second node 404 using any of a variety of communication protocols. For example, in one or more embodiments, the message is a UDP-based message package. In one or more embodiments, the message is an HTTP-based message package. In one or more embodiments, the message is a TCP message package. Indeed, the message may include any message package having a communication protocol used in transmitting a digital message package from a first node to a second node within a core network 104.

As shown in FIG. 4, the first node 402 may perform an act 410 of receiving a negative response. In one or more embodiments, the negative response refers to a response message generated and provided by the second node 404 including information that indicates a negative receipt of the message request transmitted by the first node 402. Alternatively, in one or more embodiments, the negative response may refer to an estimation of a negative response based on a period of time passing in which the message has not been processed and confirmation of the message has not been processed. For example, as discussed herein, a retry policy may indicate a most likely request processing duration associated with a likelihood that a certain percentage of messages would be received and processed successfully. In this example, the negative response may be a prediction that the message was not successfully delivered and processed based on a duration of time corresponding to the most likely request processing duration passing that the first node 402 has not received a positive response from the second node 404.

As further shown, the first node 402 may perform an act 412 of waiting a retry delay (e.g., less than or equal to a latest retry time) before sending a retry message. As noted above, the retry delay may refer to a period of time defined by the retry policy and based on timing data collected with respect to messages that were communicated between computing nodes of the core network 104.

After waiting the retry delay and not receiving a positive indication of the message being received and processed by the second node 404, the first node 402 may perform an act 414 of transmitting a retry message to the second node 404. The retry message may be a copy of the original message transmitted at act 408. As shown in FIG. 4, the first node 402 may send only a single retry message during a timeout interval associated with the corresponding message.

As shown in FIG. 4, the first node 402 may perform an act 416 of updating a number of retries. As noted above, the first node 402 may maintain a record or running total of retries that have been submitted by the first node 402 (and/or additional nodes) within a recent period of time. The first node 402 may continue to update the number of retries with each subsequent retry that is transmitted within a current period of time. The first node 402 may periodically update the retry record based on passage of time and instances of retry messages being older than some threshold of time. In this manner, the first node 402 may consider only those messages that have been retried within a threshold period of time dating back from a current time.

As shown in FIG. 4, the second node 404 may perform an act 418 of generating and transmitting a retry response in response to the previously received retry message of act 414. The retry response may indicate a positive receipt and processing of the retry message. It will be assumed that the retry response will have been processed within the timeout period that was initiated by the message request from act 408. Further, it will be noted that the retry message may have been transmitted at a timing defined by the retry policy in which a timing of the retry message is transmitted with enough time left in the timeout interval that the retry message has a significant chance of being delivered and processed within the timeout interval. As discussed above, this may involve selecting a specific point in time before the latest retry time defined by the retry policy.

As noted above, the first node 402 and the second node 404 may send and receive messages and replies over a period of time. In addition, the first node 402 may provide some number of retries that are tracked and updated to the running count of retries with each detected retry instance.

As shown in FIG. 4, the first node 402 may perform an act 420 of generating one or more additional message request(s) and providing the message request(s) to the second node 404. The first node 402 may perform an act 422 of receiving one or more additional negative response(s). As noted above, the negative response may be an explicit response indicating that the message request was not processed correctly by the second node 404. Alternatively, the negative response may be trigged by a period of time passing in which the first node 402 predicts that the message request was not received and/or successfully processed by the second node 404. The acts 420-422 may include similar features as acts 408-410 discussed above. It will be noted that while the additional message request(s) and response(s) may have similar characteristics as the original message and negative response discussed above in connection with acts 408 and 410, the additional message request(s) and additional negative response(s) (and subsequent retry messages) refer to different messages transmitted by nodes of the network. Moreover, while FIG. 4 shows the additional message request(s) being transmitted to the same second node 404 as discussed above, the additional message request (s) and response(s) may refer to requests and responses to and from any computing node within a core network.

Upon determining the negative response, the first node 402 may perform an act 424 of determining whether a maximum number of retries (e.g., a maximum number of total retries across multiple messages) have been transmitted within a recent period of time (e.g., a threshold period of time dating back from a current time). This may involve a comparison of a total number of retries for corresponding messages transmitted by the first node 402. This may involve a comparison of a number of retries for corresponding messages transmitted by multiple computing nodes (e.g., within a core network 104).

In the event that fewer than the maximum number of retries have been transmitted, the first node 402 may perform an act 426 of generating and providing a retry message to the second node 404. This may include similar features as act 414 discussed above. While not shown in FIG. 4, the first node 402 may further update a running count of total retry messages to compare against at a subsequent time.

Where the first node 402 determines that the maximum number of retries have been attempted within a recent period of time, the first node 402 may perform an act 428 of applying a modified selectivity policy to retry messages. For example, in one or more embodiments, the first node 402 may stop sending retry messages for a period of time until network conditions return to a normal state. In one or more embodiments, the first node 402 may apply more selective criteria in which messages are followed up with retry messages. For example, as discussed in one or more embodiments above, the first node 402 may send retry messages for certain types of messages (e.g., control plane messages) while not sending retry messages for other types of messages. In one or more embodiments, the first node 402 may send messages originating from certain sources or being associated with certain subscribers determined to have a higher priority than other sources or other subscribers. Indeed, the first node 402 may apply any specific criteria in selectively transmitting retry messages.

Figure 5:
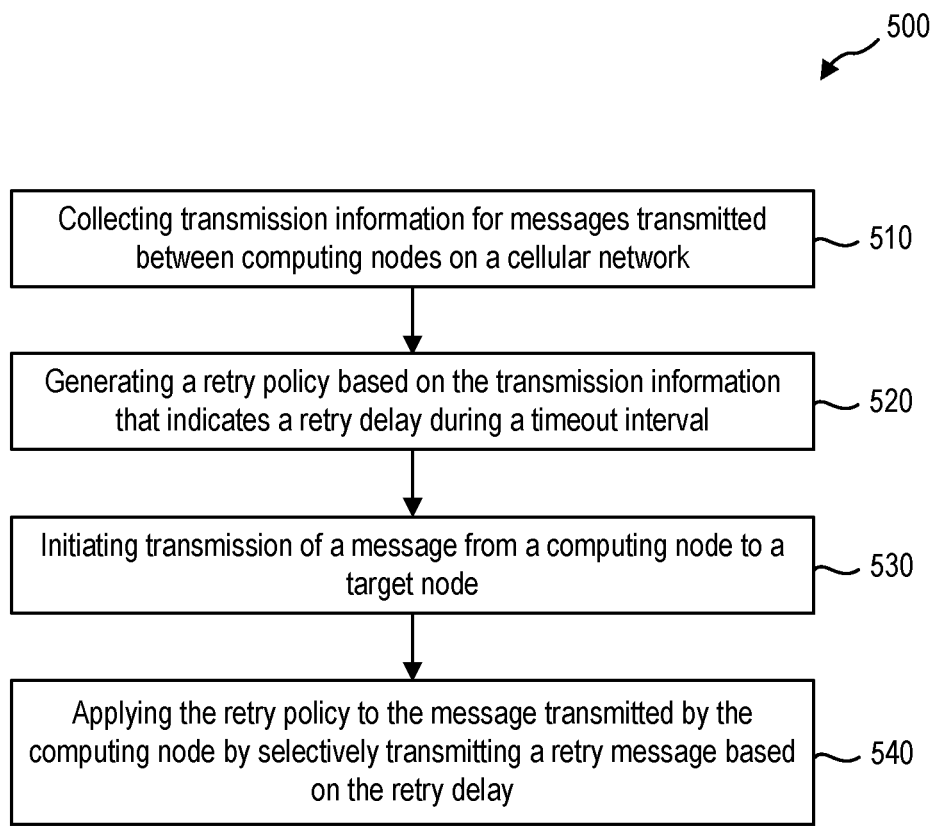
FIG. 5 illustrates an example series of acts for determining and implementing a retry policy in accordance with one or more embodiments.

Turning now to FIG. 5, this figure illustrates an example flowchart including a series of acts for implementing features and functionalities described herein. While FIG. 5 illustrates acts according to one or more embodiments, alternative embodiments may omit, add to reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

For example, FIG. 5 illustrates an example series of acts 500 for generating and implementing a retry policy in accordance with one or more embodiments described herein. As shown in FIG. 5, the series of acts 500 may include an act 510 of collecting transmission information for messages transmitted between computing nodes on a cellular network. For example, in one or more embodiments, the act 510 includes collecting transmission information for a plurality of messages transmitted between a computing node and a plurality of computing nodes (e.g., destination nodes) on a cellular network (e.g., a core network). As discussed herein, the transmission information may include timing data associated with durations of time between sending the plurality of messages and receiving responses to the plurality of messages and failure data associated with a number of messages from the plurality of messages that failed to be successfully communicated between the computing node and the plurality of computing nodes. In one or more embodiments, collecting the transmission data is performed over a predetermined period of time for which normal network conditions are determined for the cellular network. For example, in one or more embodiments, normal network conditions are determined based on the failure data indicating greater than a threshold percentage of messages from the plurality of messages being successfully communicated between the computing node and the plurality of destination nodes.

As further shown in FIG. 5, the series of acts 500 may include an act 520 of generating a retry policy based on the transmission information that indicates a retry delay during a timeout interval. For example, in one or more embodiments, the act 520 involves generating a retry policy based on the transmission information where the retry policy indicates a retry delay during a timeout interval. In one or more embodiments, a computing node may receive the retry policy including rules for transmitting retries subsequent to transmitted messages from the computing node.

The series of acts 500 may further include acts related to implementing the retry policy on a computing node. For example, as shown in FIG. 5, the series of acts 500 includes an act 530 of initiating transmission of a message from a computing node to a destination node. As further shown, the series of acts 500 may include an act 540 of applying the retry policy to the message transmitted by the computing node by selectively transmitting a retry message based on the retry delay. In one or more embodiments, the act 540 involves applying the retry policy to a message transmitted by the computing node by selectively transmitting a retry message at a delayed time within the timeout interval based on a timing of when the message was transmitted and based on the retry delay. In one or more embodiments, the act 540 involves determining that the message has not been successfully processed at the destination node and, based on determining that the message has not been successfully processed, waiting a period of time indicated by the retry delay from the retry policy and transmitting a retry message associated with the message.

In one or more embodiments, applying the retry policy to the message includes initiating transmission of a message from the computing node to a destination node, determining that the message has not been successfully processed at the destination node, and based on determining that the message has not been successfully processed, transmitting the retry message after waiting a duration of time indicated by the retry delay. In one or more embodiments, determining that the message has not been successfully processed includes receiving a failure response indicating that the message has not been successfully processed. In one or more embodiments, determining that the message has not been successfully processed includes determining that a threshold period of time within the timeout interval has passed without receiving a response to the message from the destination node.

In one or more embodiments, the series of acts 500 includes an expected response time after a beginning of a timeout interval, the expected response time being associated with a timing within which a threshold percentage of messages from the plurality of messages were successfully transmitted. In one or more embodiments, generating the retry policy includes indicating a retry delay being determining based on the expected response time, the retry delay indicating a point in time after the expected response time and prior to an end of the timeout interval. In one or more embodiments, the point in time indicated by the retry delay is before an end of the timeout interval by greater than the determined expected response time.

In one or more embodiments, the retry policy includes an instruction to selectively transmit the retry message only a single time per associated message during the timeout interval. In one or more embodiments, the series of acts 500 includes maintaining a count of a recent number of retry attempts over a predetermined period of time. In this example, the retry policy may include an indication of a maximum number of retry attempts within a predetermined period of time. Further, in one or more embodiments, applying the retry policy to the message includes determining that the count of the recent number of retry attempts is less than the indicated maximum number of retry attempts within the predetermined period of time and updating the count of the recent number of retry attempts based on transmitting the retry message.

In one or more embodiments, the computing node is a gateway node within the core network telecom environment. Further, in one or more embodiments, the message includes a communication packet containing information that is encoded based on a communication protocol, and wherein the message is transmitted via one or more of a user datagram protocol (UDP), transmission control protocol (TCP), or hypertext transfer protocol (HTTP).

Figure 6:
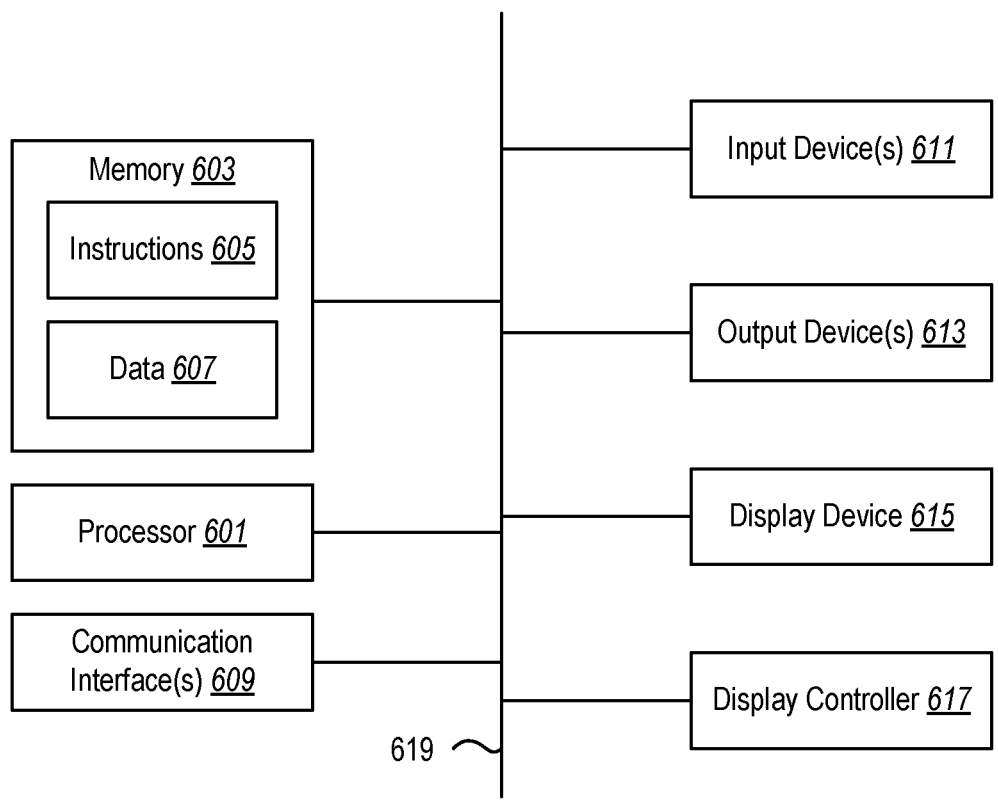
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer implemented method for transmitting retries between network devices in a core network environment, the method comprising:
    collecting transmission information for a plurality of messages transmitted between a computing node and a plurality of destination nodes on a core network, the transmission information including timing data indicating durations of time between sending messages from the plurality of messages and receiving responses to the messages from the plurality of messages;
    determining an expected response time after a beginning of a timeout interval, the expected response time being associated with a timing within which a threshold percentage of messages from the plurality of messages were successfully transmitted;
generating a retry policy indicating a retry delay being determined based on the expected response time, the retry delay indicating a point in time after the expected response time and prior to an end of the timeout interval; and
applying the retry policy to a message transmitted by the computing node, wherein applying the retry policy to the message comprises selectively transmitting a retry message at a delayed time within the timeout interval based on a time when the message was transmitted and based on the retry delay.

2. The computer-implemented method of claim 1, wherein applying the retry policy to the message comprises:
initiating transmission of the message from the computing node to a destination node;
determining that the message has not been successfully processed at the destination node; and
based on determining that the message has not been successfully processed, transmitting the retry message after waiting a duration of time indicated by the retry delay.

3. The method of claim 2, wherein determining that the message has not been successfully processed at the destination node is based on one or more of:
receiving a failure response indicating that the message has not been successfully processed; or
determining that a threshold period of time within the timeout interval has passed without receiving a response to the message from the destination node.

4. The method of claim 1, wherein collecting the transmission data is performed over a predetermined period of time for which normal network conditions are determined for the core network.

5. The method of claim 1, wherein the transmission information includes failure data associated with a percentage of messages that failed to be successfully communicated between the computing node and the plurality of destination nodes, and wherein the normal network conditions are determined based on the failure data indicating greater than a threshold percentage of messages from the plurality of messages being successfully communicated between the computing node and the plurality of destination nodes.

6. The method of claim 1, wherein the point in time indicated by the retry delay is before an end of the timeout interval by greater than the determined expected response time.

7. The method of claim 1, wherein the retry policy includes an instruction to selectively transmit the retry message only a single time per associated message during the timeout interval.

8. The method of claim 1, further comprising maintaining a count of a recent number of retry attempts over a predetermined period of time,
wherein the retry policy includes an indication of a maximum number of retry attempts within a predetermined period of time, and
wherein applying the retry policy to the message includes:
determining that the count of the recent number of retry attempts is less than the indicated maximum number of retry attempts within the predetermined period of time; and
updating the count of the recent number of retry attempts based on transmitting the retry message.

9. The method of claim 1, wherein the computing node is a gateway node within the core network.

10. The method of claim 1, wherein the message comprises a communication packet containing information that is encoded based on a communication protocol, and wherein the message is transmitted via one or more of a user datagram protocol (UDP), transmission control protocol (TCP), or hypertext transfer protocol (HTTP).

11. A system, comprising:
one or more processors;
a memory in electronic communication with the one or more processors; and
instructions stored in the memory, the instructions being executable by the one or more processors to:
collect transmission information for a plurality of messages transmitted between a computing node and a plurality of destination nodes on a core network, the transmission information including timing data indicating durations of time between sending messages from the plurality of messages and receiving responses to the messages from the plurality of messages;
determine an expected response time after a beginning of a timeout interval, the expected response time being associated with a timing within which a threshold percentage of messages from the plurality of messages were successfully transmitted;
generate a retry policy indicating a retry delay being determined based on the expected response time, the retry delay indicating a point in time after the expected response time and prior to an end of the timeout interval; and
apply the retry policy to a message transmitted by the computing node, wherein applying the retry policy to the message comprises selectively transmitting a retry message at a delayed time within the timeout interval based on a time when the message was transmitted and based on the retry delay.

12. The system of claim 11, wherein applying the retry policy to the message comprises:
initiating transmission of the message from the computing node to a destination node;
determining that the message has not been successfully processed at the destination node; and
based on determining that the message has not been successfully processed, transmitting the retry message after waiting a duration of time indicated by the retry delay.

13. The system of claim 12, wherein determining that the message has not been successfully processed at the destination node is based on one or more of:
receiving a failure response indicating that the message has not been successfully processed; or
determining that a threshold period of time within the timeout interval has passed without receiving a response to the message from the destination node.

14. The system of claim 11, wherein the retry policy includes an instruction to selectively transmit the retry message only a single time per associated message during the timeout interval.

15. The system of claim 11, further comprising instructions being executable by the one or more processors to maintain a count of a recent number of retry attempts over a predetermined period of time,
wherein the retry policy includes an indication of a maximum number of retry attempts within a predetermined period of time, and wherein applying the retry policy to the message includes:
    determining that the count of the recent number of retry attempts is less than the indicated maximum number of retry attempts within the predetermined period of time; and
    updating the count of the recent number of retry attempts based on transmitting the retry message.

16. A non-transitory computer readable medium storing instructions thereon that, when executed by at least one processor, causes one or more computing devices to:
    collect transmission information for a plurality of messages transmitted between a computing node and a plurality of destination nodes on a core network, the transmission information including timing data indicating durations of time between sending messages from the plurality of messages and receiving responses to the messages from the plurality of messages;
    determine an expected response time after a beginning of a timeout interval, the expected response time being associated with a timing within which a threshold percentage of messages from the plurality of messages were successfully transmitted;
    generate a retry policy indicating a retry delay being determined based on the expected response time, the retry delay indicating a point in time after the expected response time and prior to an end of the timeout interval; and
    apply the retry policy to a message transmitted by the computing node, wherein applying the retry policy to the message comprises selectively transmitting a retry message at a delayed time within the timeout interval based on a time when the message was transmitted and based on the retry delay.

17. The non-transitory computer readable medium of claim 16, wherein applying the retry policy to the message comprises:
    initiating transmission of the message from the computing node to a destination node;
    determining that the message has not been successfully processed at the destination node; and
    based on determining that the message has not been successfully processed, transmitting the retry message after waiting a duration of time indicated by the retry delay.

18. The non-transitory computer readable medium of claim 17, wherein determining that the message has not been successfully processed at the destination node is based on one or more of:
    receiving a failure response indicating that the message has not been successfully processed; or
    determining that a threshold period of time within the timeout interval has passed without receiving a response to the message from the destination node.

19. The non-transitory computer readable medium of claim 16, wherein the retry policy includes an instruction to selectively transmit the retry message only a single time per associated message during the timeout interval.

20. The non-transitory computer readable medium of claim 16, further comprising instructions thereon that, when executed by the at least one processor, causes the one or more computing devices to maintain a count of a recent number of retry attempts over a predetermined period of time,
    wherein the retry policy includes an indication of a maximum number of retry attempts within a predetermined period of time, and
    wherein applying the retry policy to the message includes:
        determining that the count of the recent number of retry attempts is less than the indicated maximum number of retry attempts within the predetermined period of time; and
        updating the count of the recent number of retry attempts based on transmitting the retry message.

\* \* \* \* \*